(12) United States Patent
Heimdal et al.

(10) Patent No.: US 10,150,687 B2
(45) Date of Patent: Dec. 11, 2018

(54) SLUDGE BLENDING THICKENER

(71) Applicant: Ovivo Inc., Montreal (CA)

(72) Inventors: Tor Heimdal, Salt Lake City, UT (US);
Ryan Clark, Lehi, UT (US); Scott Hawkins, Sugarland, TX (US); John Vorwaller, Salt Lake City, UT (US)

(73) Assignee: Ovivo Inc., Montreal (CA)

( * ) Notice: Subject to any disclaimer, the term of this patent is extended or adjusted under 35 U.S.C. 154(b) by 33 days.

(21) Appl. No.: 15/448,088

(22) Filed: Mar. 2, 2017

(65) Prior Publication Data

US 2017/0253516 A1  Sep. 7, 2017

Related U.S. Application Data

(60) Provisional application No. 62/303,730, filed on Mar. 4, 2016.

(51) Int. Cl.
*B01F 5/10* (2006.01)
*C02F 11/12* (2006.01)
*B01F 7/22* (2006.01)

(52) U.S. Cl.
CPC .............. *C02F 11/12* (2013.01); *B01F 5/104* (2013.01); *B01F 7/22* (2013.01); *B01F 2215/0052* (2013.01); *C02F 2301/046* (2013.01)

(58) Field of Classification Search
CPC .......... B01F 5/104; B01F 5/108; B01F 7/007; B01F 7/165; B01F 7/22; B01F 2215/0052; B01F 3/1221; B01F 2003/1285; C02F 11/12; C02F 11/121; C02F 2301/046
See application file for complete search history.

(56) References Cited

U.S. PATENT DOCUMENTS 2,651,615 A * 9/1953 Kelly ..................... B01D 21/00
                                                          210/197

* cited by examiner

*Primary Examiner* — Patrick J Orme
(74) *Attorney, Agent, or Firm* — Thomas M. Freiburger

(57) ABSTRACT

In a sludge thickener water/wastewater treatment system, sludge solids are recirculated with a mixer positioned in the influent column or offset from the center column and within the stilling well, in order to produce essentially constant sludge solids concentration in the sludge withdrawn from the thickener. This solves the problem of thickeners producing inconsistent underflow solids concentration and often exhibiting problems with binding of rake arms due to sometimes very high sludge concentrations. Also, dewatering steps that follow thickening typically require a relatively constant solids concentration for efficient operation.

3 Claims, 4 Drawing Sheets

SLUDGE BLENDING THICKENER

This application claims benefit of provisional application No. 62/303,730, filed Mar. 4, 2016.

BACKGROUND OF THE INVENTION

This invention concerns water and wastewater treatment systems and methods, and specifically relates to sludge thickening processes in a treatment system, wherein sludge settles to the bottom of a tank, and to improvements in the thickener and process.

Thickened sludge, particularly sludge at water treatment plants, often tends to entrap the rake arms of the thickener in "mud", tripping alarms and incapacitating the sludge thickener mechanism by stopping the rake arms when the drive mechanism becomes overloaded. Also, when the thickened sludge is withdrawn from the thickener, it tends to "post hole" at the withdrawal point, where the solids concentration withdrawn begins at a high level and then over a short period of time thins out for the duration of the withdrawal period, or wherein the thickener intermittently delivers high concentrated solids and low concentrated solids as the rake arm passes over the withdrawal point.

This strong fluctuation in the level of solids concentration in the output of a thickener makes operation of a downstream dewatering device difficult, especially when a dewatering floc aid such as polymer is used in a constant amount, or when the dewatering device requires a relatively constant feed solids concentration because of the operation of screw presses, belt presses or centrifuges.

SUMMARY OF THE INVENTION

According to the current invention, the solution to this problem is to recirculate settled sludge, blending that sludge with lower-solids liquid higher in the thickener tank so as to blend the sludge and maintain an essentially constant solids concentration in the sludge withdrawn from the tank. This can be accomplished using a recirculation tube or column with an internal recirculation mixer, which is installed in the center of the thickener, concentric with the thickener mechanism driving the rotating rake arms. This may also be accomplished with offset mixers, outside the center column but within the feedwell. A portion of the settled, thickened solids mass is recirculated from the bottom of the thickener tank, mixed with influent flow and discharged into the center influent stilling well located in the upper part of the thickener tank. The mixer moves the sludge into the mixing zone in the stilling well. The recirculation mixer can operate either at a constant speed or with adjustable speed so as to maintain an optimum internal recirculation rate. The mixer can be turned off to allow solids to settle more completely in the tank and water to be withdrawn from the tank, resulting in an increase in solids concentration in the thickener tank. Such shutoff of the mixer should be of timing and duration so as not to allow an objectionable level of fluctuation in the concentration of output sludge.

The internal recirculation mixer in a thickener according to the invention provides relatively constant solids concentration in the waste sludge flow from the thickener. This is accomplished by providing a constant, uniform solids concentration in the settled mass over the solids withdrawal point of the thickener, located near the bottom center of the thickener tank.

Internal and offset recirculation mixers have been used previously in a different context, in reactor clarifiers. In that context the objective is an effluent of clean water with very low solids content. The influent coming in has a low solids content and requires chemical to promote coagulation which enables the solids to come together and make larger particles that settle faster. This can be a slow process, so the reactor clarifier uses a recirculation drum with an internal mixer impeller to lift the solids from the sludge blanket and have them come into contact with the influent in the recirculation drum. The sludge from the sludge blanket is at a high solids concentration and increases the probability that solids from the influent at a low solids concentration will come into contact with solids from the sludge blanket to further increase the size of the solids particle. This combined flow enters the clarifier's reaction zone cone just above the impeller at the top of the recirculation drum. The reaction zone provides a quiet region where the solids can continue to flocculate and grow in size. This increases the settling rate of the solid particles which produces a high quality effluent containing minimal solids. The low-solids water rises to the tank liquid level and exits into radial launders. The other benefit of a high solids settling rate in a clarifier is that it requires a smaller tank to process the same amount of influent flow.

In contrast, the objective of the invention is to improve the performance of a sludge thickener by recirculating solids from the sludge blanket to produce an essentially homogenous sludge solids concentration for withdrawal from the bottom. The objective of the thickener is a consistent thick solids concentration in the sludge blanket, where the sludge exits the tank. Quality of the effluent over a weir is not the main consideration. The point is to achieve as consistent a high-solids concentration as possible, for avoiding problems of overloads and rake arm stoppage as well as to provide for efficient dewatering in a downstream dewatering device. The step of mixing so that sludge mixes with low-solids liquid has a very different function, purpose and effect in the current thickener—to achieve a constant solids concentration in the withdrawn sludge output. The mixed sludge settles from the stilling well to the tank bottom and produces a more consistent solids content in sludge discharged from the tank, through a discharge pipe.

A principal object of the invention is to improve consistency of thickened effluent sludge from a thickener, to assure efficiency in a downstream process. These and other objects, advantages and features of the invention will be apparent from the following description of a preferred embodiment, considered along with the accompanying drawings.

DESCRIPTION OF PREFERRED EMBODIMENTS

Figure 1:
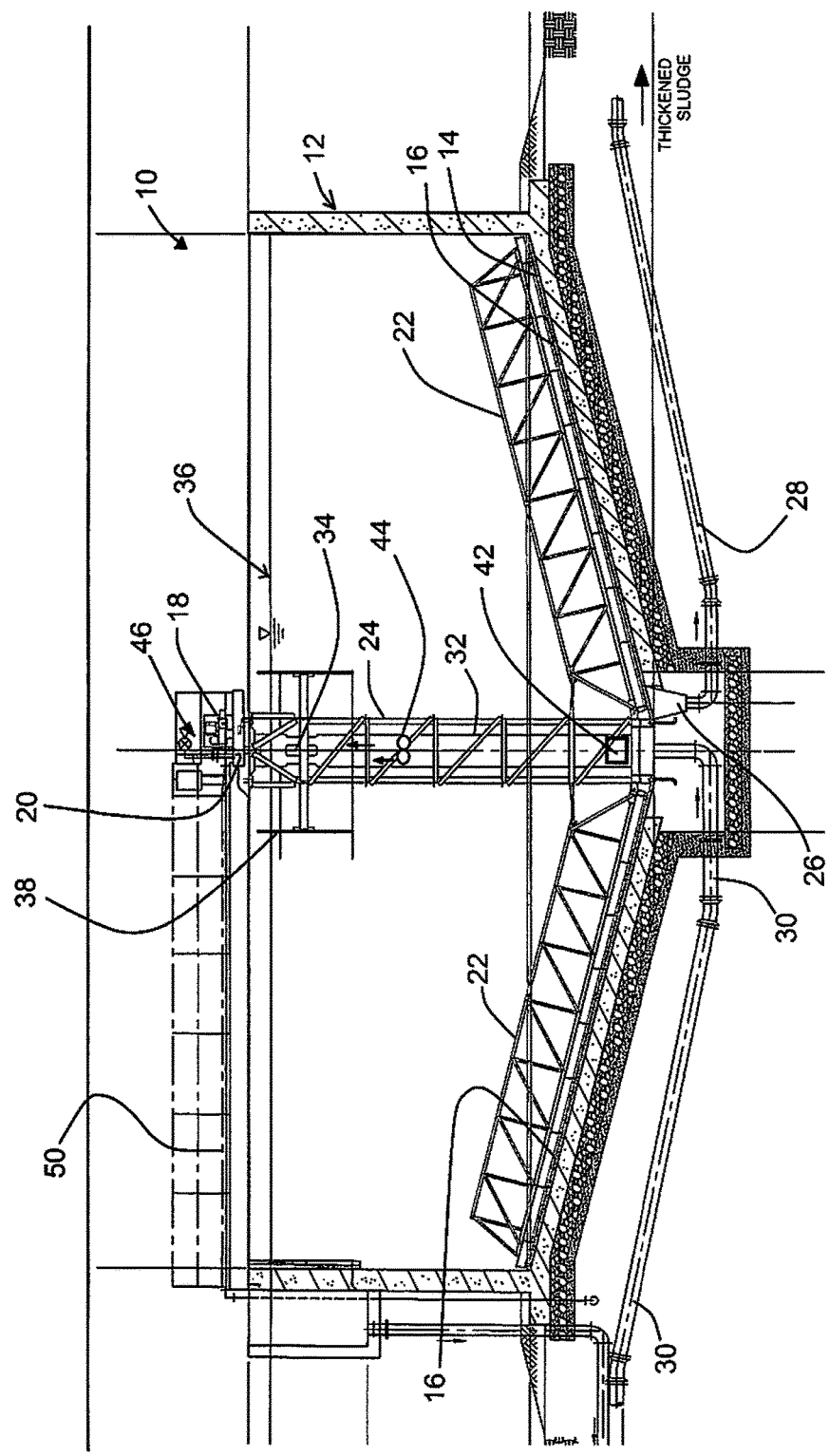
FIG. 1 is a sectional elevation view showing a sludge blending thickener of the invention.

FIG. 1 shows a sludge thickener 10 according to the invention, the thickener being generally similar to a typical sludge thickener employed in a treatment plant. However, the thickener 10 has additional equipment for blending settled sludge with influent of lower solids concentration within the basin, so that it functions as a sludge blending thickener resulting in the benefits described above.

The tank or basin 12, shown as formed of concrete or steel, has a sloped basin floor 14 as shown, and a pair of sludge rakes 16, as typical, that sweep along the floor as driven by a drive unit 18 on a fixed platform 20 above the center of the basin. The drive for the rake arms, which are secured to truss arms 22, is via a drive cage 24. Settled sludge migrates inwardly toward center under influence of the rake arms, and exits the tank via a lower collection basin or trough 26 and a discharge pipe 28.

Influent is delivered into the thickener basin from a clarifier via a pipe 30 and through a center column 32 positioned within the driving cage 24 but stationary. The influent is discharged into the tank via openings 34 in the center influent column 32, below the liquid surface 36. The influent sludge flows into the liquid in the basin within an influent stilling well 38 that may have a diameter of about 12 feet and a height of about 7 feet, for example. The center influent column typically has a diameter of about 3 feet.

Figure 2:
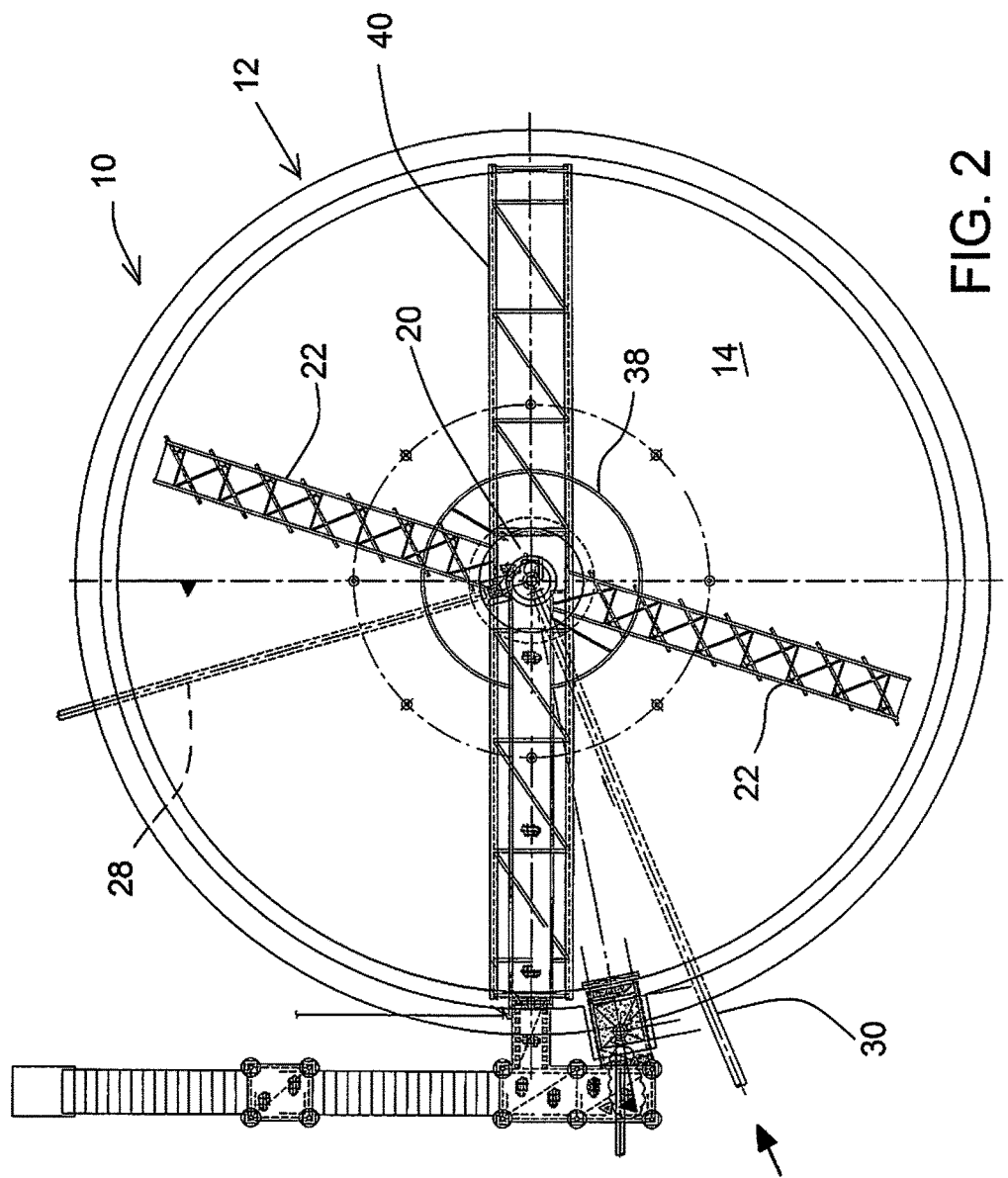
FIG. 2 is a plan view showing the sludge blending thickener.

Many of these various components can be seen in the plan view of FIG. 2, which also shows a beam and bracing structure 40 that spans across the center of the tank.

Figure 3:
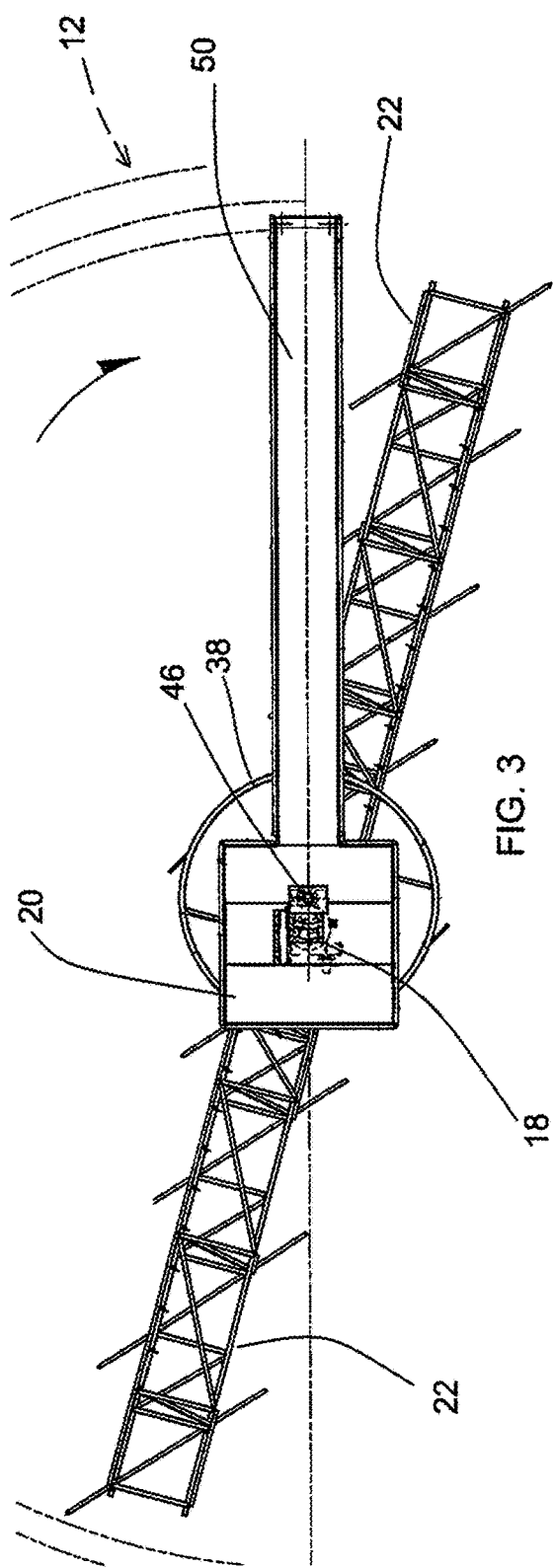
FIG. 3 is a detail plan view showing certain features of the invention.
Figure 4:
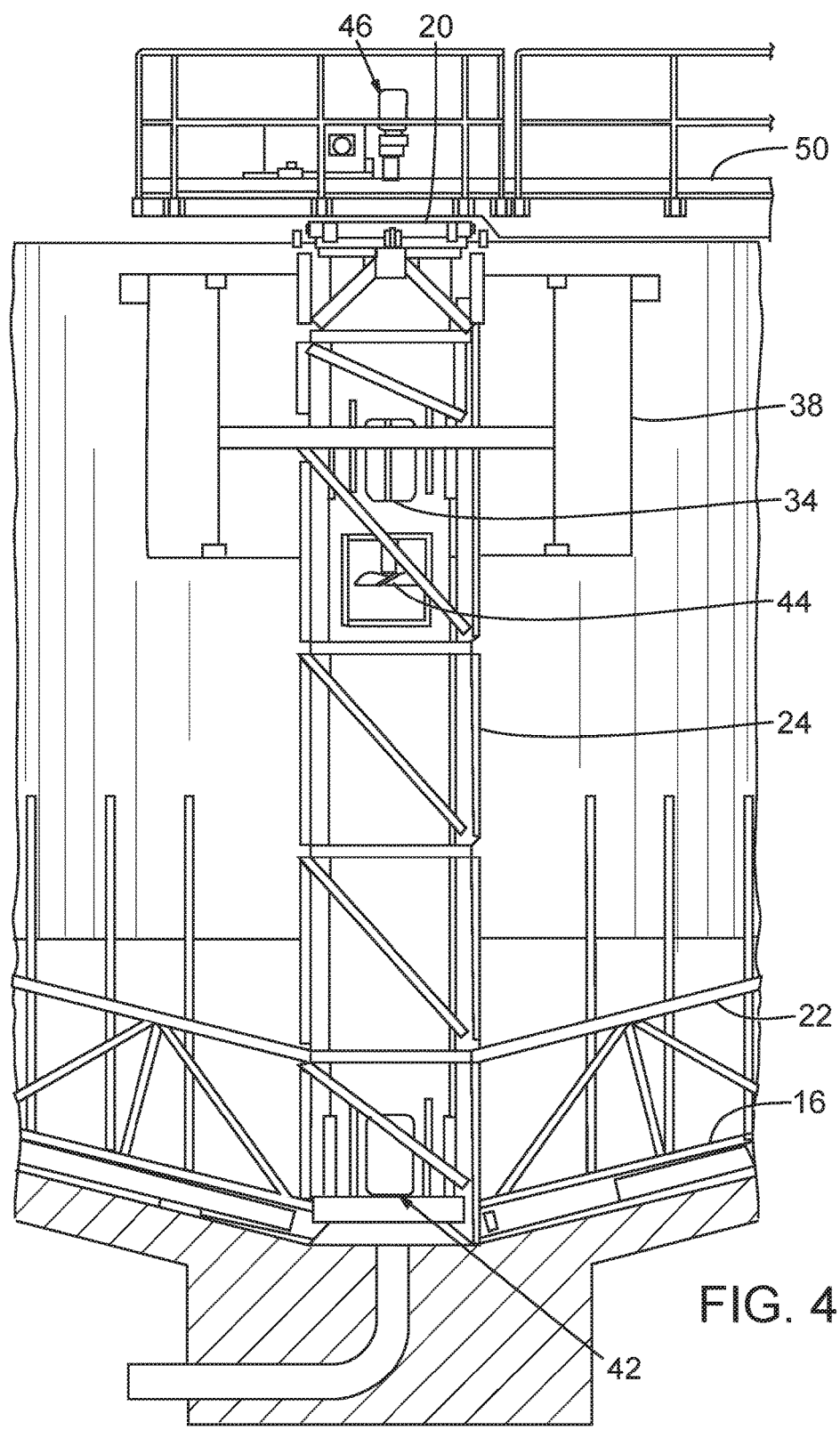
FIG. 4 is a detail partial sectional elevation view showing a central region of the sludge blending thickener.

The plan view of FIG. 3 shows a partial detail view at the top of the tank. FIGS. 1, 3 and 4 show a column-supported drive, but this and other equipment could be supported on a beam (bridge) structure such as that shown at 40 in FIG. 2, in a different version of the invention. In a bridge-supported drive a rotating rake shaft and attached drum extend down from the bridge to drive the rakes. In that case an impeller can be within the rotatable drum, with the impeller (mixer) shaft concentric within the hollow rake shaft.

Pursuant to the invention at least one recirculation suction opening 42 is provided near the base of the center column 32. Settled sludge, i.e. liquid with high solids concentration, enters the center column through this opening 42, driven by an impeller 44 indicated schematically as being above, within the center column. A recirculation mixer drive unit 46 is positioned at the elevated platform 20, which can be the same platform where the drive unit 18 is located for the center drive cage 24. The impeller 44 is driven at relatively low RPM so as to move the sludge up the column for exit out through the discharge openings 34, which also discharge newly arriving influent. The influent pipe penetrates the tank floor and rises concentrically to the center column to an elevation above the top of the recirculation ports and below the recirculation mixer, where the recirculated sludge comes into contact with influent. This also prevents the influent from exiting the recirculation ports when the recirculation mixer is turned off.

FIG. 4 shows schematically a central section of the thickener basin with the center column seen in cross section. The impeller 44 is driven by the impeller motor, i.e. the mixer drive motor 46 shown on the fixed platform 20 at top. The recirculation ports 42 and influent ports 34 are schematically indicated in the center column. The impeller 44 is shown just below the sludge influent ports.

The plan view of FIG. 3 shows the equipment platform 20 with the mixer drive motor 46, which can be, for example, a three HP rapid mixer with inverter duty motor. The drive unit 18 for the driving cage is also indicated at the platform.

FIG. 3 shows a typical fixed walkway 50 leading to the center of the tank and to the equipment platform 20. This is also shown in FIG. 1.

By recirculating settled sludge from near the bottom of the basin, the sludge blending thickener of the invention is constantly mixing high-solids sludge with liquid of much lower solids concentration, thus blending the higher and lower solids liquids to provide, in the settled sludge blanket at the bottom of the basin, a substantially constant solids concentration for exit through the thickened sludge outlet pipe 28 for delivery to a further dewatering process as described above, such as a screw press, belt press or centrifuge. As explained above, this has important benefits in the dewatering process, in terms of consistent concentration for the polymer floc agent used for the dewatering process, and efficiency of the dewatering process itself.

The above described preferred embodiments are intended to illustrate the principles of the invention, but not to limit its scope. Other embodiments and variations to these preferred embodiments will be apparent to those skilled in the art and may be made without departing from the spirit and scope of the invention, as defined in the following claims.

We claim:

1. In a thickener for settling and concentrating solids content in a water or wastewater treatment system contained in a thickener tank and including an influent pipe carrying influent to a point of influent delivery in the thickener tank, a stilling well, and rotating rake arms that gather solids along the bottom of the thickener tank to be discharged from the tank at a discharge pipe, the improvement comprising:
    a sludge recirculation conduit positioned within the thickener tank with an inlet of the conduit near the bottom of the tank to collect raked sludge or liquid with high solids content, the conduit extending upwardly in the thickener tank, to above the point of influent delivery into the tank, and
    a motor-driven impeller in the tank, positioned to draw the sludge through the sludge recirculation conduit and to mix sludge from the recirculation conduit with influent having a low solids concentration to produce a mixed sludge delivered into the stilling well,
    whereby the mixed sludge settles to the bottom of the thickener tank, and inconsistency in the concentration of settled sludge exiting the tank through the discharge pipe is minimized.

2. The improvement defined in claim 1, wherein the thickener has a center column, within which the point of influent delivery is located such that influent is delivered into the interior of the center column, and the sludge recirculation conduit including a port in a wall of the center column serving as said inlet of the conduit, said motor-driven impeller being positioned within the center column so as to mix influent with the recirculated sludge from the recirculation conduit, and the center column including one or more influent delivery ports at the level of the stilling well, the stilling well being positioned surrounding the center column.

3. The improvement defined in claim 2, wherein the center column includes at its upper end an equipment platform, with an impeller motor that drives the motor-driven impeller secured on the equipment platform.

* * * * *